United States Patent
Saeki

(10) Patent No.: US 9,869,239 B2
(45) Date of Patent: Jan. 16, 2018

(54) WASTEGATE VALVE CONTROL DEVICE

(75) Inventor: Masanori Saeki, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 14/422,616

(22) PCT Filed: Aug. 23, 2012

(86) PCT No.: PCT/JP2012/071355
§ 371 (c)(1),
(2), (4) Date: Jul. 10, 2015

(87) PCT Pub. No.: WO2014/030244
PCT Pub. Date: Feb. 27, 2014

(65) Prior Publication Data
US 2015/0337718 A1 Nov. 26, 2015

(51) Int. Cl.
*F02B 37/18* (2006.01)
*F02D 41/00* (2006.01)
*F02D 41/22* (2006.01)
*F02D 41/24* (2006.01)

(52) U.S. Cl.
CPC ........ *F02B 37/183* (2013.01); *F02D 41/0007* (2013.01); *F02B 37/18* (2013.01); *F02D 41/221* (2013.01); *F02D 41/2464* (2013.01); *Y02T 10/144* (2013.01)

(58) Field of Classification Search
CPC ........ F02B 37/183; F02B 37/12; F02B 37/18; F02D 41/0007; F02D 2200/06; F02D 2200/0614; F02D 2250/32; F02D 23/02

USPC ........................................ 60/602, 605.1, 603
See application file for complete search history.

(56) References Cited

U.S. PATENT DOCUMENTS

| 7,434,397 | B2* | 10/2008 | Hasegawa | F01N 3/00 60/602 |
|---|---|---|---|---|
| 8,515,647 | B2* | 8/2013 | Panciroli | F02D 41/0007 60/602 |
| 8,849,548 | B2* | 9/2014 | Luft | F02B 37/18 123/559.1 |
| 9,243,552 | B2* | 1/2016 | Wang | F02B 37/183 |
| 9,243,553 | B2* | 1/2016 | Kokotovic | F02B 37/22 |
| 9,273,597 | B2* | 3/2016 | Kokotovic | F02B 37/186 |
| 9,316,147 | B2* | 4/2016 | Wang | F02B 37/186 |
| 9,322,324 | B2* | 4/2016 | Landsmann | F02B 37/186 |
| 2006/0213194 | A1* | 9/2006 | Hasegawa | F01N 3/00 60/602 |

(Continued)

FOREIGN PATENT DOCUMENTS

| JP | 2006274831 A | 10/2006 |
|---|---|---|
| JP | 2006274834 A | 10/2006 |

*Primary Examiner* — Jason Shanske
*Assistant Examiner* — Jason T Newton
(74) *Attorney, Agent, or Firm* — Oliff PLC

(57) ABSTRACT

A wastegate valve is arranged in a communication passage that bypasses the exhaust turbine of a turbocharger arranged in the exhaust passage of an internal combustion engine. When the opening degree of the wastegate valve is controlled to the fully closed opening degree, a determination value is calculated based on the operation state of the internal combustion engine, and the turbo rotation speed is detected. When the turbo rotation speed is less than the determination value, a drive force is increased in the direction for closing the wastegate valve.

4 Claims, 3 Drawing Sheets

(56) References Cited

U.S. PATENT DOCUMENTS

| | | | |
|---|---|---|---|
| 2008/0066723 A1* | 3/2008 | Eiraku | F02B 39/16 123/564 |
| 2008/0276614 A1* | 11/2008 | Shu | F02B 39/16 60/602 |
| 2011/0023481 A1* | 2/2011 | Baeuerle | F01D 17/105 60/602 |
| 2011/0219861 A1* | 9/2011 | Kayama | F02D 41/22 73/114.72 |
| 2011/0273127 A1* | 11/2011 | Imamura | F02D 41/1497 318/650 |
| 2012/0291432 A1* | 11/2012 | Ulrey | F02B 37/16 60/611 |
| 2013/0312406 A1* | 11/2013 | Landsmann | F02B 37/186 60/602 |

* cited by examiner ns and downstream of the exhaust turbine are in communication with each other. In the communication passage, a wastegate valve is arranged. The control device includes an opening degree control section that controls an opening degree of the wastegate valve, an index value detection section that detects an index value for a supercharging amount of the turbocharger, and a drive force control section. When the opening degree control section controls the opening degree of the wastegate valve to a fully closed opening degree, the drive force control section calculates a determination value based on an operation state of the internal combustion engine, and detects the index value using the index value detection section. If the detected index value indicates a low supercharging state in which the supercharging amount is lower than the determination value, the drive force control section increases a drive force in a direction for closing the wastegate valve.

WASTEGATE VALVE CONTROL DEVICE

TECHNICAL FIELD

The present invention relates to a wastegate valve control device arranged in a communication passage through which portions of an engine exhaust passage that are located upstream and downstream of the exhaust turbine of a turbocharger are in communication with each other.

BACKGROUND ART

Conventionally, a turbocharger is often used for improving the output of an internal combustion engine. To avoid excessive increase of boost pressure, it is common to employ a communication passage, which bypasses the exhaust turbine of the turbocharger, and a wastegate valve for adjusting the amount of exhaust flowing through the communication passage. Furthermore, it is suggested to control the opening degree of the wastegate valve for adjustment of the boost pressure (e.g., refer to Patent Document 1).

Operating characteristics of a wastegate valve slightly change, for example, due to long term use and the influence of thermal expansion with a rise in the temperature. Patent Document 1 proposes learning of the opening degree of a wastegate valve at the most closed position (the fully closed opening degree) within the movable range of the wastegate valve. In particular, while operating the wastegate valve at the fully closed opening degree, the actual opening degree is detected. The fully closed opening degree of the wastegate valve is learned based on the detected opening degree. The opening degree of the wastegate valve is controlled based on the fully closed opening degree learned in this way. This allows appropriately handling the difference in the opening degree caused by changes in the operating characteristics of the wastegate valve.

PRIOR ART DOCUMENT

Patent Document

Patent Document 1: Japanese Laid-Open Patent Publication No. 2006-274834

SUMMARY OF THE INVENTION

Problem that the Invention is to Solve

There is a concern for a wastegate valve that the pressure between the contact surfaces of the valve body and the valve seat of the wastegate valve partially decreases or a gap is generated between the valve body and the valve seat. This happens depending on the state of the deformed wastegate valve if the valve body and the valve seat change over time or are deformed due to thermal expansion even when the wastegate valve is accurately controlled to the fully closed opening degree. In such a case, exhaust unnecessarily escapes through the wastegate valve and a communication passage from the upstream side to the downstream side of an exhaust turbine to create unnecessary decrease in the engine torque.

An objective of the present invention is to provide a wastegate valve control device that limits the decrease of engine torque caused by changes in the operating characteristics of a wastegate valve.

Means for Solving the Problems

According to the present invention, a wastegate valve control device is provided for an internal combustion engine to achieve the above objective. The internal combustion engine includes an exhaust passage, a turbocharger having an exhaust turbine arranged in the exhaust passage, and a communication passage through which portions of the exhaust passage that are located upstream and downstream of the exhaust turbine are in communication with each other. In the communication passage, a wastegate valve is arranged. The control device includes an opening degree control section that controls an opening degree of the wastegate valve, an index value detection section that detects an index value for a supercharging amount of the turbocharger, and a drive force control section. When the opening degree control section controls the opening degree of the wastegate valve to a fully closed opening degree, the drive force control section calculates a determination value based on an operation state of the internal combustion engine, and detects the index value using the index value detection section. If the detected index value indicates a low supercharging state in which the supercharging amount is lower than the determination value, the drive force control section increases a drive force in a direction for closing the wastegate valve.

In the internal combustion engine including the turbocharger with the wastegate valve, when the opening degree of the wastegate valve becomes the fully closed opening degree, the flow of exhaust that bypasses the exhaust turbine through the communication passage is shut off. This increases the supercharging amount of the turbocharger.

The above device detects an index value (e.g., a boost pressure and a turbo rotation speed) for a supercharging amount of the turbocharger at that time and calculates the determination value based on the operation state of the internal combustion engine at that time. When the detected index value indicates a low supercharging state in which the supercharging amount of the turbocharger is lower than the determination value, the turbocharger has an unnecessarily low supercharging amount. Thus, it is determined that exhaust is possibly escaping through the wastegate valve and the communication passage.

The above device increases a drive force in a direction for closing the wastegate valve when the detected index value indicates that the supercharging amount is lower than the determination value. This allows the valve body of the wastegate valve to be strongly pushed against the valve seat when pressure partially decreases between the contact surfaces of the valve body and seat or a gap is generated between the valve body and seat due to deformation of the valve body and seat caused by changes over time or thermal expansion. Thus, it is possible to decrease the gap between the valve body and seat and increase the pressure between the contact surfaces. This inhibits unnecessary escape of exhaust through the wastegate valve and the communication passage from the upstream side to the downstream side of the exhaust turbine. Consequently, this limits the decrease of engine torque caused by changes in the operating characteristics of the wastegate valve.

Preferably, the operation state includes an intake air amount and a fuel injection amount of the internal combustion engine.

The amount of exhaust flowing through the exhaust passage of the internal combustion engine can be estimated based on the intake air amount and the fuel injection amount of the internal combustion engine. Thus, the determination value is calculated based on the intake air amount and the fuel injection amount so that the amount of exhaust flowing through the exhaust passage of the internal combustion engine, i.e., an appropriate value according to the amount of exhaust flowing into the exhaust turbine in the case without exhaust escaping through the communication passage, is calculated as the determination value. The calculated determination value is then compared to the detected index value for determination of whether exhaust is escaping through the wastegate valve and the communication passage.

Preferably, the index value for a supercharging amount of the turbocharger is a rotation speed of a rotary shaft of the turbocharger.

Preferably, an electric valve is employed as the wastegate valve.

The device adopting an electric wastegate valve can adjust the wastegate valve with great degrees of freedom, e.g., compared to a device that drives a wastegate valve using intake pressure or exhaust pressure. This suitably limits the decrease of engine torque caused by changes in the operating characteristics of the wastegate valve.

MODES FOR CARRYING OUT THE INVENTION

A wastegate valve control device according to one embodiment of the present invention will now be described.

Figure 1:
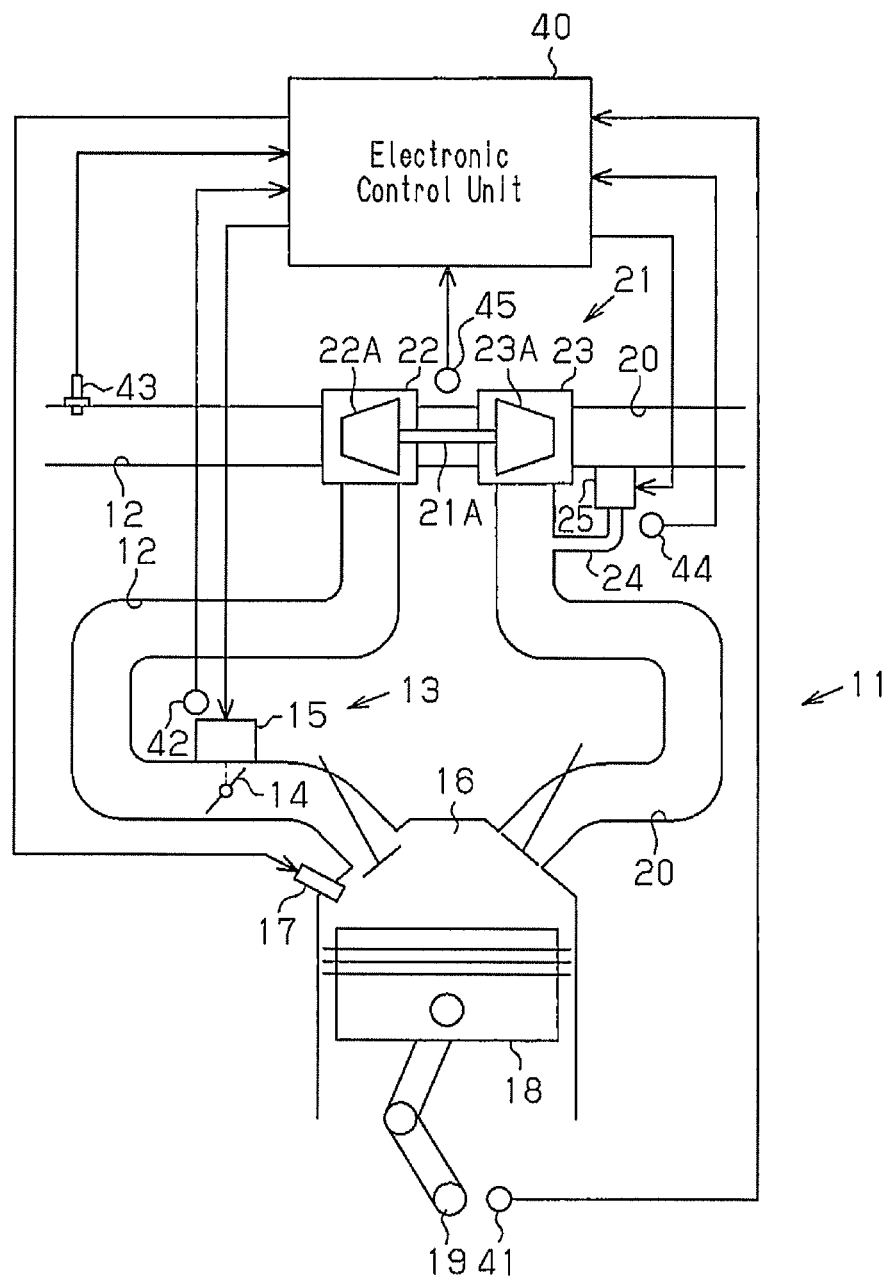
FIG. 1 is a schematic view showing a general structure of an internal combustion engine to which a wastegate valve control device according to one embodiment of the present invention is applied.

As shown in FIG. 1, an internal combustion engine 11 has an intake passage 12, to which throttle mechanism 13 is attached. The throttle mechanism 13 includes a throttle valve 14 and a throttle motor 15. The opening degree (a throttle opening degree TA) of the throttle valve 14 is adjusted by controlling operation of the throttle motor 15. This adjusts the amount of air drawn into a combustion chamber 16 through the intake passage 12. In addition, a fuel injection valve 17 is attached to the internal combustion engine 11. The internal combustion engine 11 combusts fuel injected by the fuel injection valve 17 in the combustion chamber 16 to cause reciprocal move of a piston 18 and rotate a crankshaft 19. The gas after the combustion is sent out as exhaust from the combustion chamber 16 to an exhaust passage 20.

The internal combustion engine 11 includes a turbocharger 21 that performs supercharging by pressurizing and supplying intake air in the intake passage 12. In particular, the turbocharger 21 has a compressor 22 attached to a portion of the intake passage 12 of the internal combustion engine 11 that is located upstream of the throttle mechanism 13 in the direction of intake flow (hereinafter, referred to simply as "upstream side"). The turbocharger 21 has an exhaust turbine 23 attached to the exhaust passage 20 of the internal combustion engine 11. The turbocharger 21 is an exhaust driven turbocharger, in which a compressor wheel 22A arranged inside the compressor 22 is integrally coupled to a turbine wheel 23A arranged inside the exhaust turbine 23 by a rotary shaft 21A.

A communication passage 24 is attached to the exhaust passage 20 of the internal combustion engine 11. The communication passage 24 bypasses the exhaust turbine 23 so that portions of the exhaust passage 20 that are located upstream and downstream of the exhaust turbine 23 in the direction of exhaust flow (hereinafter, referred to simply as "upstream side" and "downstream side") are in communication with each other. A wastegate valve 25 is attached to the communication passage 24.

Figure 2:
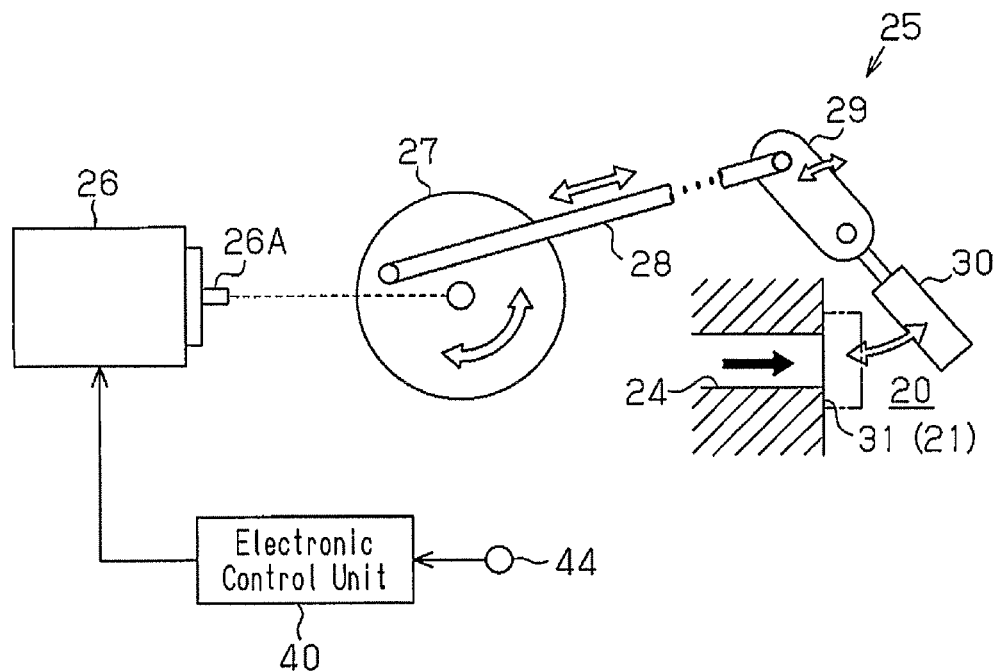
FIG. 2 is a schematic view showing a specific structure of the wastegate valve.

As shown in FIG. 2, the wastegate valve 25 is an electric valve, of which the opening degree is adjusted by controlling operation of the electric motor 26. In particular, the electric motor 26 has an output shaft 26A, which is connected to a rotary gear 27 via gear mechanism (not shown). The rotary gear 27 is coupled to a rocking arm 29 with a coupling rod 28. The wastegate valve 25 has a valve body 30 fixed to the rocking arm 29.

When the output shaft 26A is rotated by controlling operation of the electric motor 26, the coupling rod 28 is moved along with rotation of the rotary gear 27 as indicated by blank arrows in FIG. 2. As a result, the rocking arm 29 moves together with the valve body 30 of the wastegate valve 25. According to the present embodiment, such operation control of the electric motor 26 controls the opening degree of the wastegate valve 25.

As indicated by a long dashed short dashed line in FIG. 2, when the opening degree of the wastegate valve 25 becomes an opening degree with which the valve is in the most closed state in the movable range, i.e., the fully closed opening degree with which the valve body 30 comes into contact with the valve seat 31, by controlling operation of the electric motor 26, the flow of exhaust through the communication passage 24 (the flow indicated by the black arrow shown in FIG. 2), which bypasses the exhaust turbine 23 (refer to FIG. 1), is shut off. In this state, substantially whole exhaust of the internal combustion engine 11 flows into the exhaust turbine 23. The device according to the present embodiment has the communication passage 24 integrated with the turbocharger 21, to which the wastegate valve 25 is attached. A portion of the inner face of the turbocharger 21 that the valve body 30 of the wastegate valve 25 comes into contact with serves as the valve seat 31.

When the wastegate valve 25 has an opening degree other than the fully closed opening degree as indicated by solid lines in FIG. 2, a portion of the exhaust passage 20 that is located upstream of the exhaust turbine 23 communicates with a portion of the exhaust passage 20 that is located downstream of the exhaust turbine 23 through the communication passage 24. In this case, some of exhaust bypasses the exhaust turbine 23 and flows through the communication passage 24.

The device according to the present embodiment includes an electronic control unit 40 having, e.g., a microcomputer. The electronic control unit 40 receives detection signals from various sensors for detecting the operation state of the internal combustion engine 11. Examples of the sensors are a crank sensor 41 for detecting the rotation speed of the crankshaft 19 (an engine speed NE) and a throttle sensor 42 for detecting the throttle opening degree TA. The device is also provided with an air flow meter 43, which is attached to a portion of the intake passage 12 that is located upstream of the compressor 22 and detects the amount of air passing through the intake passage 12 (an intake air amount GA). Other examples are an opening degree sensor 44 for detecting the opening degree of the wastegate valve 25 (an actual opening degree VP) and a speed sensor 45 for detecting the rotation speed of the rotary shaft 21A of the turbocharger 21 (a turbo rotation speed NT).

The electronic control unit 40 receives detection signals of various sensors and performs various computations based on the signals. Further, the electronic control unit 40 executes various controls such as operation controls of the throttle mechanism 13, the fuel injection valve 17, and the wastegate valve 25 based on the computed results. The electronic control unit 40 functions as an opening degree control section and a drive force control section.

Operation control of the wastegate valve 25 is executed in the following way. A control target value for the opening degree of the wastegate valve 25 (a target opening degree TV) is set based on the engine speed NE and an engine load factor KL. Operation of the electric motor 26 is controlled to match the actual opening degree of the wastegate valve 25 to the target opening degree TV. The engine load factor KL is one of index values for the load of the internal combustion engine 11 and is the ratio (%) of the actual intake air amount per rotation to the maximum intake air amount per rotation of the internal combustion engine 11 on natural aspiration.

In operation control of the wastegate valve 25, the fully closed opening degree is set as the target opening degree TV while the engine is operated at the engine speed NE greater than or equal to a predetermined speed (e.g., 1600 rotations per minute) and at the engine load factor KL greater than or equal to a predetermined ratio (e.g., 150%). When the target opening degree TV is set at the fully closed opening degree, operation of the electric motor 26 is controlled such that the valve body 30 of the wastegate valve 25 (FIG. 2) is pushed against the valve seat 31.

When the target opening degree TV is set at the fully closed opening degree, the actual opening degree VP detected by the opening degree sensor 44 is stored in a memory of the electronic control unit 40 as a learning value of the fully closed opening degree. In operation control of the wastegate valve 25, the actual opening degree of the wastegate valve 25 is calculated from the fully closed opening degree and the actual opening degree VP learned and memorized in this way.

Even when the wastegate valve 25 is accurately controlled to the fully closed opening degree, the pressure between the contact surfaces of the valve body 30 and the valve seat 31 may partially decrease or a gap may be generated between the valve body 30 and the valve seat 31, depending on changes over time of the valve body 30 and the valve seat 31 of the wastegate valve 25 and deformation due to thermal expansion. In such a case, the unnecessary decrease in the engine torque may be caused due to exhaust unnecessarily escaping from the upstream side to the downstream side of the exhaust turbine 23 through the wastegate valve 25 and the communication passage 24.

Taking these points in consideration, the present embodiment increases the drive force in the direction for closing the wastegate valve 25 (the direction for pushing the valve body 30 against the valve seat 31) if it is determined that exhaust is possibly escaping from the upstream side to the downstream side of the exhaust turbine 23 through the communication passage 24 when the wastegate valve 25 is controlled to the fully closed opening degree.

In particular, when the target opening degree TV is set at the fully closed opening degree, the speed sensor 45 detects the turbo rotation speed NT, and a determination value J is calculated based on the state of engine operation such as the intake air amount GA, the fuel injection amount, and the throttle opening degree TA. When the turbo rotation speed NT is less than the determination value J, the turbocharger 21 has an unnecessarily low supercharging amount. Thus, it is determined that exhaust is possibly escaping through the wastegate valve 25 and the communication passage 24, and the drive force in the direction for closing the wastegate valve 25 (in particular, the drive force of the electric motor 26) is increased. According to the present embodiment, the rotation speed of the rotary shaft 21A of the turbocharger 21 serves as an index value for a supercharging amount of the turbocharger 21. The speed sensor 45 functions as an index value detection section for detecting the index value, and the turbo rotation speed NT serves as the detected index value, i.e., a detection value.

Operation

Operation when a drive force is increased in the direction for closing the wastegate valve 25 will now be described.

Figure 3:
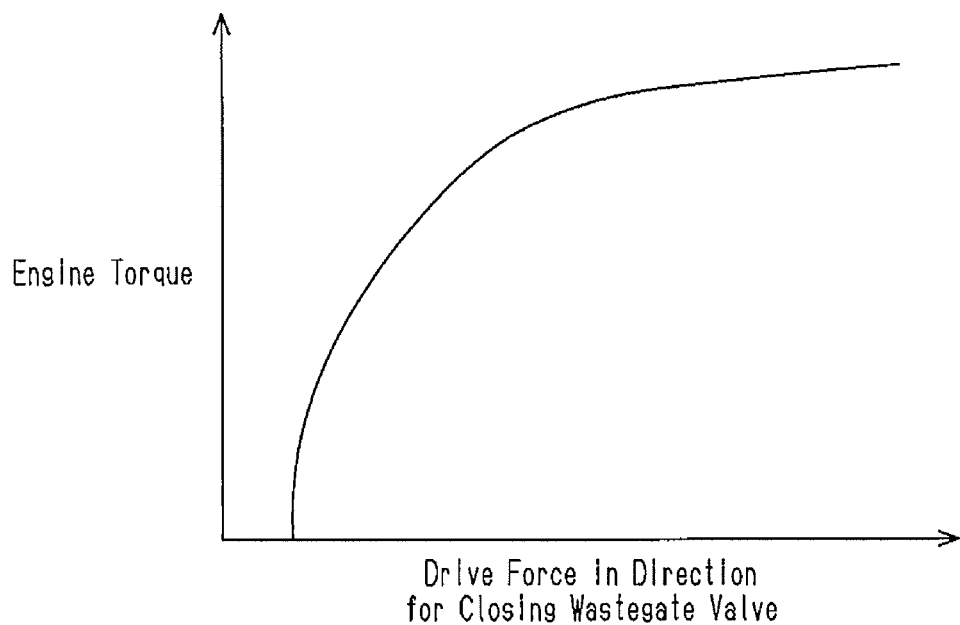
FIG. 3 is a graph showing an example of the relationship between a drive force in the direction for closing the wastegate valve and engine torque.

FIG. 3 shows a measurement result of the relationship between the drive force in the direction for closing the wastegate valve 25 and the engine torque when the opening degree of the wastegate valve 25 is the fully closed opening degree. It is clear from FIG. 3 that the greater the drive force in the direction for closing the wastegate valve 25, the greater the engine torque becomes. It is thought that because exhaust escaping through the wastegate valve 25 is reduced by the increased pressure between the contact surfaces of the valve body 30 of the wastegate valve 25 and the valve seat 31 and the like.

The present embodiment allows the valve body 30 of the wastegate valve 25 to be strongly pushed against the valve seat 31 when pressure partially decreases between the contact surfaces of the valve body 30 and the valve seat 31 or a gap is generated between the valve body 30 and the valve seat 31 due to deformation of the valve body 30 and the valve seat 31 caused by changes over time or thermal expansion. Thus, it is possible to decrease the gap between the valve body 30 and the valve seat 31 or increase the pressure between the contact surfaces. This inhibits unnecessary escape of exhaust through the wastegate valve 25 and the communication passage 24 from the upstream side to the downstream side of the exhaust turbine 23. Consequently, this limits the decrease of engine torque caused by changes in the operating characteristics of the wastegate valve 25.

The amount of exhaust flowing through the exhaust passage 20 of the internal combustion engine 11 is accurately estimated based on the intake air amount and the fuel injection amount of the internal combustion engine 11. The present embodiment uses the intake air amount GA and the fuel injection amount as calculation parameters used in calculation of the determination value J. Thus, the amount of exhaust flowing through the exhaust passage 20 of the internal combustion engine 11, i.e., an appropriate value according to the amount of exhaust flowing into the exhaust turbine 23 in the case without exhaust escaping through the communication passage 24, is calculated as the determination value J, which is compared to the turbo rotation speed NT for determination of whether the exhaust is escaping through the communication passage 24.

The present embodiment uses an electric valve driven by the electric motor 26 as the wastegate valve 25 to adjust the wastegate valve with greater degrees of freedom than, for example, a device that drives a wastegate valve using intake pressure and exhaust pressure. This suitably limits the decrease of engine torque caused by changes in the operating characteristics of the wastegate valve 25.

Specific steps in a process for increasing a drive force in the direction for closing the wastegate valve 25 (a drive force increase process) will now be described in detail with reference to the flowchart shown in FIG. 4. A series of tasks indicated by the flowchart of FIG. 4 is executed by the electronic control unit 40 as interruption processing at predetermined intervals.

Figure 4:
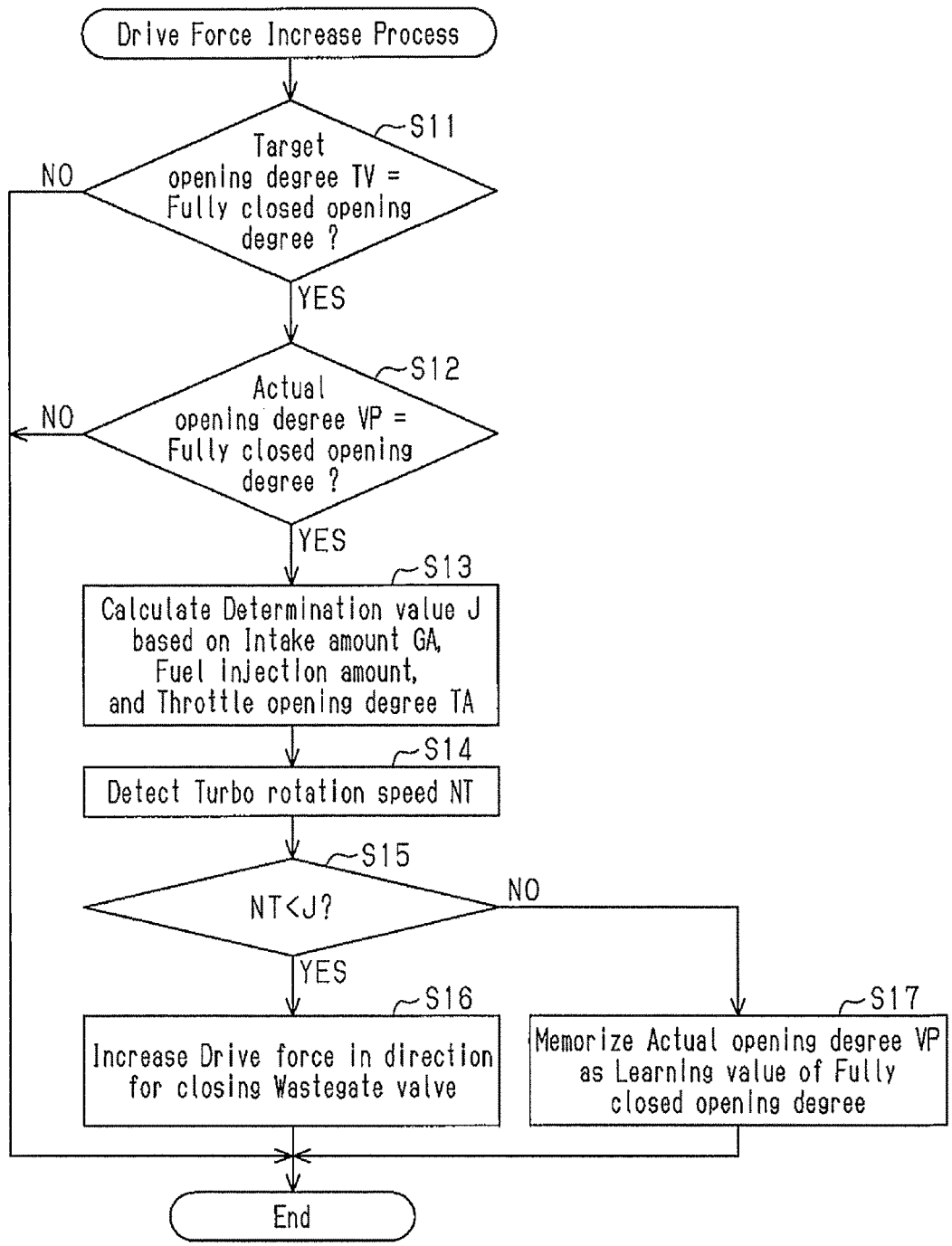
FIG. 4 is a flowchart showing steps of a process for increasing a drive force.

In this process, it is first determined whether both the following conditions are satisfied as shown in FIG. 4.

The target opening degree TV is the fully closed opening degree (step S11).
The actual opening degree VP is the fully closed opening degree (step S12).

If one or both of the conditions are not satisfied (step S11: NO or step S12: NO), the process is temporarily suspended without executing the following tasks (tasks at steps S13 to S17).

After that, the process is repeatedly executed. When both conditions are satisfied (step S11: YES and step S12: YES), the determination value J is calculated based on the intake air amount GA, the fuel injection amount, and the throttle opening degree TA (step S13). According to the present embodiment, a relationship among the determination value J, the intake air amount GA, the fuel injection amount, and the throttle opening degree TA is obtained in advance based on the results of various experiments and simulations. The relationship enables prompt and accurate determination of exhaust escaping through the wastegate valve 25 from the upstream side to the downstream side of the exhaust turbine 23. The relationship is memorized in the electronic control unit 40. The task at step S13 calculates the determination value J based on the relationship. In particular, the greater the intake air amount GA, the greater the fuel injection amount, and the greater the throttle opening degree TA, the greater the rotation speed of the rotary shaft 21A of the turbocharger 21 becomes, so that the determination value J is set at a great value. The determination value J may be set at a slightly lower speed than, e.g., an ideal turbo rotation speed depending on the state of engine operation at the moment.

The speed sensor 45 detects the turbo rotation speed NT (step S14), and it is determined whether the turbo rotation speed NT is less than the determination value J (step S15).

When the turbo rotation speed NT is less than the determination value J (step S15: YES), a task of increasing a drive force in the direction for closing the wastegate valve 25 is performed (step S16). In particular, operation of the electric motor 26 is controlled to increase supply of power to the electric motor (refer to FIG. 2).

When the turbo rotation speed NT is greater than or equal to the determination value J (step S15: NO), the actual opening degree VP at that time is memorized as a learning value of the fully closed opening degree without performing the task of increasing a drive force in the direction for closing the wastegate valve 25 (step S17). The fully closed opening degree is learned in this way so that the fully closed opening degree is learned when a quite small amount of exhaust escapes through the wastegate valve 25. Since the fully closed opening degree is learned at the right position, the opening degree of the wastegate valve 25 is accurately adjusted to a quite small opening degree (a minimum opening degree) close to the fully closed opening degree. Accordingly, the minimum opening degree is effectively utilized in the engine control.

The present embodiment as described above provides the following advantages.

(1) When the target opening degree TV is set at the fully closed opening degree, the turbo rotation speed NT is detected, and the determination value J is calculated based on the state of engine operation. When the turbo rotation speed NT is less than the determination value J, the drive force in the direction for closing the wastegate valve 25 is increased. This limits the decrease of engine torque caused by changes in the operating characteristics of the wastegate valve 25.

(2) The determination value J is calculated based on the intake air amount GA and the fuel injection amount. Thus, as the determination value J, which is compared to the turbo rotation speed NT for determination of whether exhaust is escaping through the communication passage 24, an appropriate value can be calculated that corresponds to the amount of exhaust flowing through the exhaust passage 20 of the internal combustion engine 11, i.e., the amount of exhaust flowing into the exhaust turbine 23 in the case without exhaust escaping through the communication passage 24.

(3) An electric valve, which is driven by the electric motor 26, is used as the wastegate valve 25. This suitably limits the decrease of engine torque caused by changes in the operating characteristics of the wastegate valve 25.

The above embodiment may be modified in the following forms.

Optional calculation parameters may be used in calculation of the determination value J as long as the intake air amount GA and the fuel injection amount of the internal combustion engine 11 are included in the calculation parameters. One of the calculation parameters may be a value correlated with the supercharging amount of the turbocharger 21, such as a control amount of a member for operating the accelerator pedal or the engine speed NE.

A configuration may be employed in which, when the target opening degree TV is set at the fully closed opening degree, a pressure sensor detects the pressure of a portion of the intake passage 12 that is located downstream of the throttle mechanism 13 (a boost pressure P), and a determination value is calculated based on the state of engine operation. When the boost pressure P is less than the determination value, a drive force in the direction for closing the wastegate valve 25 may be increased. In this device, the boost pressure serves as an index value for the supercharging amount of the turbocharger 21, and the pressure sensor functions as an index value detection section that detects the index value.

When the target opening degree TV is set at the fully closed opening degree, an index value for a supercharging amount may be detected such that the less the supercharging amount of the turbocharger 21, the greater the detected index value becomes. When the detected index value is greater than a determination value that is calculated based on the state of engine operation, the drive force is increased in the direction for closing the wastegate valve 25. An example of the index value may be the inverse of the turbo rotation speed (1/turbo rotation speed) or the inverse of the boost pressure (1/boost pressure).

The embodiment may be modified as long as the determination value is calculated based on the state of engine operation and the index value for the supercharging amount of the turbocharger 21 is detected while controlling the wastegate valve 25 at the fully closed opening degree. When the detected index value indicates a low supercharging state in which the supercharging amount is lower than the determination value, the drive force is increased in the direction for closing the wastegate valve 25.

The device according to the above embodiment is not limited to a device including the wastegate valve 25, which is driven by the electric motor 26. The above embodiment may be applied to a device including a wastegate valve driven by an electromagnetic solenoid by modifying the configuration as necessary.

DESCRIPTION OF THE REFERENCE NUMERALS

11: internal combustion engine, 12: intake passage, 13: throttle mechanism, 14: throttle valve, 15: throttle motor, 16: combustion chamber, 17: fuel injection valve, 18: piston, 19: crankshaft, 20: exhaust passage, 21: turbocharger, 21A: rotary shaft, 22: compressor, 22A: compressor wheel, 23: exhaust turbine, 23A: turbine wheel, 24: communication passage, 25: wastegate valve, 26: electric motor, 26A: output shaft, 27: rotary gear, 28: coupling rod, 29: rocking arm, 30: valve body, 31: valve seat, 40: electronic control unit, 41: crank sensor, 42: throttle sensor, 43: air flow meter, 44: opening degree sensor, and 45: speed sensor.

The invention claimed is:

1. A wastegate valve control device for an internal combustion engine, wherein the internal combustion engine includes an exhaust passage, a turbocharger having an exhaust turbine arranged in the exhaust passage, and a communication passage through which portions of the exhaust passage that are located upstream and downstream of the exhaust turbine are in communication with each other, wherein a wastegate valve is arranged in the communication passage, the control device comprising:
   a sensor that detects an index value for a supercharging amount of the turbocharger; and
   an electronic control unit that includes control logic, which when executed, controls an opening degree of the wastegate valve, wherein when the electronic control unit controls the opening degree of the wastegate valve to a fully closed opening degree in which a valve body of the wastegate valve comes into contact with a valve seat of the wastegate valve, the electronic control unit:
      detects the index value using the sensor, and
      increases a drive force in a direction for closing the wastegate valve to increase a pushing force of the valve body against the valve seat if the detected index value indicates a low supercharging state in which the supercharging amount is lower than a determination value,
   wherein the determination value is based on an intake air amount and a fuel injection amount of the internal combustion engine.

2. A wastegate valve control device for an internal combustion engine, wherein the internal combustion engine includes an exhaust passage, a turbocharger having an exhaust turbine arranged in the exhaust passage, and a communication passage through which portions of the exhaust passage that are located upstream and downstream of the exhaust turbine are in communication with each other, wherein a wastegate valve is arranged in the communication passage, the control device comprising:
   a sensor that detects an index value for a supercharging amount of the turbocharger; and
   an electronic control unit that includes control logic, which when executed, controls an opening degree of the wastegate valve, wherein when the electronic control unit controls the opening degree of the wastegate valve to a fully closed opening degree in which a valve body of the wastegate valve comes into contact with a valve seat of the wastegate valve, the electronic control unit:
      detects the index value using the sensor, and
      increases a drive force in a direction for closing the wastegate valve to increase a pushing force of the valve body against the valve seat if the detected index value indicates a low supercharging state in which the supercharging amount is lower than a determination value,
   wherein the index value is a rotation speed of a rotary shaft of the turbocharger.

3. The wastegate valve control device according to claim 1, wherein the wastegate valve is an electric valve.

4. A wastegate valve control method for an internal combustion engine, wherein the internal combustion engine includes an exhaust passage, a turbocharger having an exhaust turbine arranged in the exhaust passage, and a communication passage through which portions of the exhaust passage that are located upstream and downstream of the exhaust turbine are in communication with each other, wherein a wastegate valve is arranged in the communication passage and includes a valve seat and a valve body that moves toward and away from the valve seat, the control method comprising:
   when controlling an opening degree of the wastegate valve to a fully closed opening degree in which the valve body comes into contact with the valve seat,
      detecting an index value using a sensor for a supercharging amount of the turbocharger, and
      increasing a drive force using an electronic control unit in a direction for closing the wastegate valve to increase a pushing force of the valve body against the valve seat if the detected index value indicates a low supercharging state in which the supercharging amount is lower than a determination value,
   wherein the determination value is based on an intake air amount and a fuel injection amount of the internal combustion engine.

* * * * *